Figure 1:
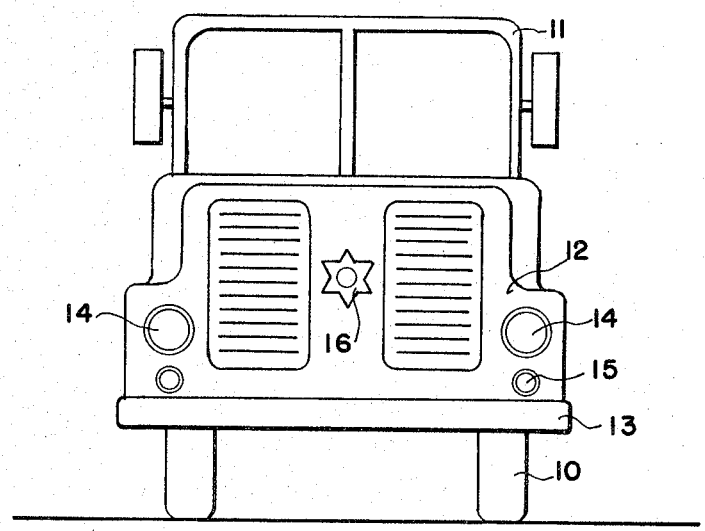

March 21, 1967  D. MARIAN  3,310,774
MONITORING LIGHTS FOR ROAD VEHICLES
Filed April 1, 1964

INVENTOR.
DANIEL MARIAN
BY
Francis J. Klempay
ATTORNEY

United States Patent Office 3,310,774
Patented Mar. 21, 1967

3,310,774
MONITORING LIGHTS FOR ROAD VEHICLES
Daniel Marian, 3924 Cascade Drive,
Youngstown, Ohio 44511
Filed Apr. 1, 1964, Ser. No. 356,592
2 Claims. (Cl. 340—62)

This invention relates to signaling systems for road vehicles, and more particularly to an improved arrangement whereby the motoring public at large can readily monitor the speed and acceleration condition of a motor vehicle on the highway. As will appear hereinafter, the invention is of a special utility when used on heavy motor trucks, although the principles of the invention are equally applicable for use in connection with lighter passenger vehicles.

Lighting and/or signaling systems as currently used on road vehicles, particularly heavy motor trucks, are deficient in two important aspects. First, the tremendous increase in motor truck engine power enables heavy lorries to move at near passenger car speeds but the motoring public generally tends to consider these heavy rigs as moving at relatively low speeds, and illusion being heightened by the large physical size of the vehicles. To overcome this defect and thereby contribute to the safety of highway traffic, this invention proposes that a distinctive light be installed on the front of the vehicle which at below a certain speed—45 m.p.h., for example—glows steadily so long as the vehicle is in motion but which flashes on and off when the vehicle is traveling at a speed above the preselected value. In this manner, a motorist attempting to enter across a highway or attempting to pass another vehicle on a highway with traffic coming toward him will be better and instantaneously informed of the traffic conditions he will encounter in making his move.

Secondly, a series source of danger on the highway are heavy trucks which have slowed down or are in the process of slowing down while in the driving lane of the highway because of grade conditions, for example, and in any event without the application of brakes to energize the stop-light signals. To overcome this problem and thus to further provide for highway safety, this invention proposes that a distinctive red light be mounted on the rear of the vehicle and controlled in such manner that it begins to flash on and off while the vehicle is yet in motion but has slowed down to less than 35 miles an hour, for example. Present regulations and equipment provide for adequate warning signals when a motor truck has stopped on a highway, for any reason, but there is nothing now currently in use which informs a motorist coming up from the rear that a vehicle is reducing its speed well below highway standards.

It is accordingly the primary object of the invention to provide a distinctive signaling system for use on motor vehicles which will automatically indicate the motion and speed condition of the vehicle from the front and the acceleration and speed condition of the vehicle from the rear, all to be used in conjunction with the present lighting and signaling systems to lend additional safety to highway travel. A secondary object of the invention is to provide for such improvements while yet minimizing and simplifying the added equipment on the vehicle.

The above and other objects and advantages of the invention will become apparent upon consideration of the following specification and the accompanying drawing wherein there is disclosed a preferred embodiment of the invention.

Figure 2:
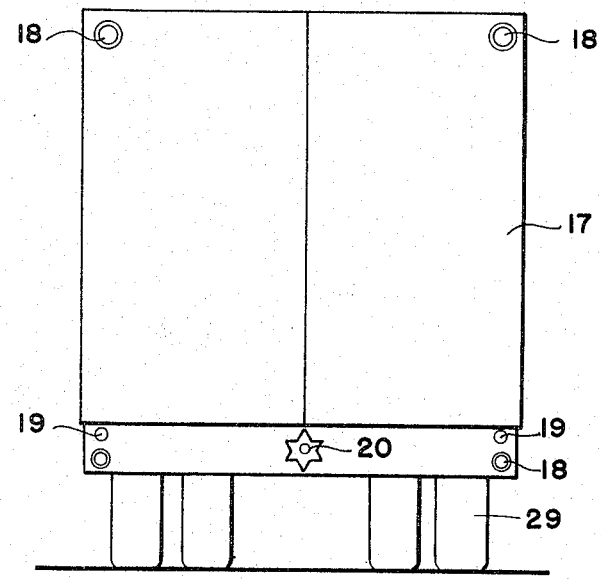

In the drawing:
FIGURES 1 and 2 are fragmentary front and rear elevations, respectively, of a motor truck equipped with signaling devices provided in accordance with the principles of the present invention; and FIGURE 3 is a schematic showing of the energizing and control circuit for the signaling devices of FIGURES 1 and 2 constructed in accordance with the invention.

FIGURE 1 of the drawing shows the front end of a motor truck or tractor having road wheels 10, a driver's cab 11, and a front exterior sheet metal wall 12 forming guards for the wheels 10 and an enclosure for the radiator and engine of the vehicle. In accordance with usual practice, the wall 12 extends above a front bumper 13 which is rigidly mounted on the frame of the vehicle, not shown, and mounts the conventional headlights 14 and turn signals 15. In accordance with this invention, I provide a distinctively shaped light projector 16 in a distinctive location on the front of the vehicle and preferably on the wall 12. As indicated in FIGURE 1 the light projector 16 may be star-shaped, or it may be of other distinguishing appearance, and is preferably located between and above the conventional headlights 14. The projector 16 is lensed to project a white or clear light in compliance with various laws now in effect, and as will appear hereinafter the signaling effected by this invention is accomplished, in part, by having the projector 16 continuously energized at speeds below a selected value—50 m.p.h., for example—and by causing this light source to flash when the vehicle speed is above this value.

In FIGURE 2 reference numeral 29 designates the load-bearing road wheels of the truck or trailer while reference numeral 17 designates the real wall of the vehicle. Mounted on this rear wall or on the vehicle frame which supports it are a plurality of conventional red-colored tail-lights 18 and combined stop-lights and turn-signals 19. Interposed centrally between the stop-lights and lowermost tail-lights is a distinctively-shaped red-lensed light projector 20 which is mounted on the rear of the vehicle preferably above the lower-most tail-lights but below the rear entry doors of the truck or trailer. Again, the projector 20 may be star-shaped for distinctive appearance although other distinguishing signals may be selected to indicate to other motorists that the projector is a part of the normal and conventional lighting and signaling systems used on vehicles. For normal operation and speed the projector 20 is not energized but in accordance with this invention I provide an automatic circuit which causes intermittent energization or flashing of this signaling light source when the speed of the motor vehicle drops below a predetermined value—35 m.p.h., for example. Since it is now universal practice to employ two widely spaced red-lensed "stop" lights on the rear of motor vehicles, it will be at once apparent to a motorist gaining on the vehicle from the rear that the vhicle is merely slowing down probably because of grade conditions if and when only the signal 20 begins to flash. The signal 20 preferably has a higher degree of brilliance than the conventional tail-lights 18 so that it can be noted even under most daylight conditions.

Figure 3:
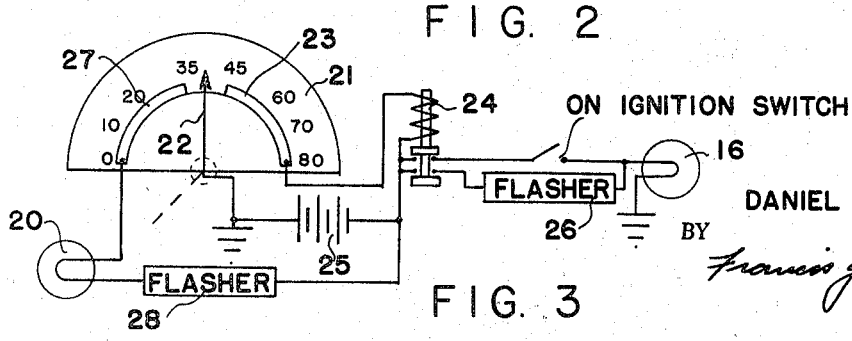

Referring now to FIGURE 3, I provide a vehicle speed indicator 21 having a grounded pointer contact 22 which advances in proportion to the speed attained by the vehicle, and this assembly 21 may be provided in place of the conventional speedometers now employed. On the dial of this device 21 is a conductive shoe 23 which is contacted by the arm 22 upon the vehicle obtaining speeds of 45 m.p.h. and beyond, and upon such happening a relay 24 is energized. Relay 24 has a normally closed contact which connects the vehicle battery 25 with the forward light projector 16 when either the ignition switch of the vehicle is turned on or the transmission of the vehicle is in a forward gear. Relay 24 is also provided with a normally open contact which connects the lamp 16 with the vehicle battery through a periodic circuit interrupter or "flasher" 26 when the speed of the vehicle approaches or exceeds a predetermined value—45 m.p.h., for example.

The speed responsive device 21 is provided with a second contact shoe 27 which is positioned to be engaged by the conductive pointer 22 at all speeds of the vehicle below a predetermined value—35 m.p.h., for example. The pointer 22 and the shoe 27 selectively serve as a switch to connect the rear signal lamp 20 to the battery 25 through a second periodic current interrupter of "flasher" 28. Thus, at normal highway speeds the rear signal lamp 20 remains de-energized but upon the vehicle slowing down below the preset limit due to traffic or grade conditions or power failure the signal lamp 20 begins to flash to inform other motorists coming up from behind of this deceleration. Slow-moving vehicles, particularly when decelerating at speeds far below normal, are especially hazardous on high-speed turnpikes and freeways. By informing motorists approaching from behind of this condition, anticipatory corrective measures can be taken at once to avoid subsequent emergency actions and thereby perhaps prevent skidding or accidents. The warning is accentuated if, in addition, the conventional stop-lights come on.

It should now be apparent that I have provided an improved speed monitoring or signaling system for highway motor vehicles which accomplishes the objects initially set out above. When a vehicle equipped with the system is viewed from the front the given indication of motion and approximate speed can be profitably assessed in determining whether a crossing should be made, an entering lane used, or an overtake pursued if the road is two-lane. When approaching the vehicle from the rear the absence of any special signal indicates that the vehicle is running at near normal speed while the flashing of the rear signal of this invention indicates that the vehicle is moving quite slow—requiring caution either by slowing down or appraising the safety of an overtake.

Obviously, it is within the purview of the present invention to provide manual switches for either or both of the signal lights 16 and 20 to cause the same to flash regardless of the existent speed of the vehicle, if such additional control is thought to be desirable. Such additional control would be of an overriding nature as will be understood.

An important aspect of the invention is that the added signaling devices provided thereby are in themselves distinctive in appearance and are distinctively positioned on the vehicle in relation to the other lights thereon. Thus, as regards the rear flashing red light particularly, the same is most useful in indicating a slow speed, whether the signal is on a school bus, heavy equipment on a highway, or any vehicle which has slowed down to negotiate sharp curves, railroad underpasses, etc. The flashing light instinctively denotes danger ahead, constitutes an early warning to any following drive that corrective action or increased caution must be taken at once. Safety in road and highway travel is thus enhanced.

Having thus described my invention what I claim is:
1. A signaling system for a highway motor vehicle comprising in combination a white or clear-lensed light projector mounted on the front of the vehicle in a distinctive positional relation to the normal head and signal lights on the front of the vehicle and having a viewable appearance which is distinctive with respect to said head and signal lights, a distinctively shaped red-lensed light projector on the rear of said vehicle positioned in distinctive positional relation with respect to the normal tail and signal lights on the rear of the vehicle, and energizing and control circuits to continuously energize the first mentioned projector so long as the vehicle is running under a predetermined speed, means to cause said first mentioned projector to flash on and off when said predetermined speed is exceeded, and means to cause the second mentioned projector to become periodically energized when the speed of the vehicle drops below the predetermined value.

2. A system according to claim 1 further characterized in that said control circuits include a switch contact movable in one direction from a zero point to positions proportional to the speed of travel of the vehicle, and a pair of conductive shoes which is spaced along the path of travel of said movable contact for engagement thereby, the shoe closest to said zero point being in the energizing circuit of said second mentioned projector and the shoe furthest from said zero point controlling the energization of said first mentioned projector.

References Cited by the Examiner

UNITED STATES PATENTS 3,121,865   2/1964   Kelley et al. _____ 340—264

FOREIGN PATENTS 613,141   11/1960   Italy.

OTHER REFERENCES

Publication: "Safety Signal For Trucks, Buses, Vans and Trailers," by Wig-Wag Safety Signal Co., 7/35.

NEIL C. READ, *Primary Examiner.*

A. H. WARING, *Assistant Examiner.*